United States Patent [19]

Park

[11] Patent Number: 5,021,887
[45] Date of Patent: Jun. 4, 1991

[54] METHOD AND CIRCUIT FOR COMPOSING STILL IMAGE OF PICTURE-IN-PICTURE

[75] Inventor: Yung-Jun Park, Suweon, Rep. of Korea

[73] Assignee: SamSung Electronics Co., Ltd., Kyung, Rep. of Korea

[21] Appl. No.: 449,793

[22] Filed: Dec. 13, 1989

[51] Int. Cl.[5] .................. H04N 5/262; H04N 5/272
[52] U.S. Cl. ................................ 358/183; 358/22; 358/11
[58] Field of Search ............. 358/183, 182, 181, 903, 358/22, 11

[56] References Cited

U.S. PATENT DOCUMENTS

| | | | |
|---|---|---|---|
| 4,729,028 | 3/1988 | Hakamada et al. | 358/22 |
| 4,774,582 | 9/1988 | Hakamada et al. | 358/22 |
| 4,777,531 | 10/1988 | Hakamada et al. | 358/22 |
| 4,816,915 | 3/1989 | Imai et al. | 358/181 |
| 4,918,518 | 4/1990 | Phillips | 358/22 |

*Primary Examiner*—John K. Peng
*Assistant Examiner*—Tuan V. Ho
*Attorney, Agent, or Firm*—Robert E. Bushnell

[57] ABSTRACT

A circuit for composing a still sub picture video image for a picture-in-picture (PIP) video display displaying a main picture and a sub picture in an area of the main picture includes a write address generator for storing in a memory the sub picture data of every second line of an input video image field so as to vertically compress the input image field data, along with a read address generator which reads-out the data stored at odd-numbered memory addresses in step with the horizontal sync signal of the first field of the main picture signal to compose a first video field of the sub picture display and which also reads out the data stored at even-numbered memory addresses in step with the horizontal sync signal of the second field of the main picture signal to compose a second video field of the sub picture display, enabling a sub picture consisting of first and second sub picture image fields but composed from the data of only a single input image field to be displayed in step with the corresponding first and second fields of the main picture. The circuit and corresponding method for composing a still video sub picture for PIP video displays compress the input image field data and require less memory capacity than conventional PIP display techniques while composing the two fields of the sub picture from data of a single input image field avoids picture shake in the displayed still sub picture.

4 Claims, 5 Drawing Sheets

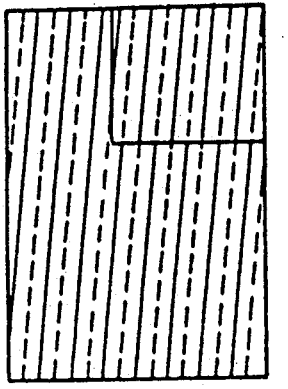
FIG.2(A) 1ST FIELD
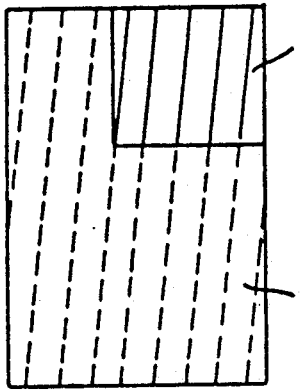
FIG.2(B) 2ND FIELD
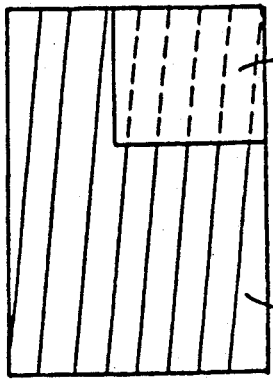
FIG.2(C) (A + B)
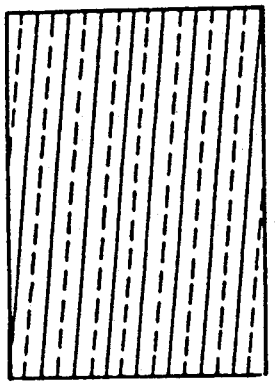
FIG.3(A) 1ST FIELD    2ND FIELD
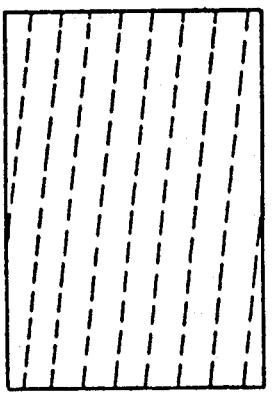
FIG.3(B) 2ND FIELD    1ST FIELD
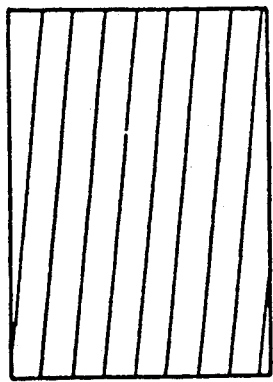
FIG.3(C)

METHOD AND CIRCUIT FOR COMPOSING STILL IMAGE OF PICTURE-IN-PICTURE

BACKGROUND OF THE INVENTION

This invention relates to a television(TV) with picture-in-picture (PIP) showing two pictures by composing another picture in a portion of a composing picture, particularly to a method and circuit for composing still image to prevent picture shake and reduction of vertical resolution for the PIP.

Generally, a PIP TV has a function for showing a main picture and a sub picture of another image signal in a portion of the main picture. The image signal composing the sub picture in the main picture can be made by reading again the image information in step with a field of the main picture after sampling image data in each field and storing it in memory part, thereby making two pictures.

The conventional TV with such function of PIP includes a typical TV circuit and a PIP circuit. That is, in the conventional TV circuit, a microcomputer(MICOM) controls a tuner and intermediate frequency(IF) amplifier 101 and a signal switching part 103 according to key inputs, then an audio signal amplifier 102 provides an audio signal through a speaker SP. A image-processing and synchronization-separating part 105 provides the image signal to be displayed on a cathode-ray tube(CRT) through a high voltage generation and deflecting part 106 and a CRT driver 113. Next, the PIP circuit reads the image signal for the sub picture in step with the synchronization signal of the main picture after storing the image signal for the sub picture in the memory part, in order to compose the PIP.

In more detail, the image signal for the sub picture selected by the signal switching part 103 is divided into a synchronization signal, a luminance signal and a color signal at the synchronization-separating and image signal-processing part 104. The synchronization signal is provided to a clock generator 107, while the luminance and color signals are provided to a analog-to-digital-(A/D) converter 108.

Next, after an data control part 109 stores the analog-to-digital converted data in accordance to the generated synchronization signal and clock signal from the clock generator 107 in the memory part 110, the stored data of the memory part 110 are read with the clock signal of the clock generator 107 in step with the synchronization signal for the main picture and provided to the digital-to-analog(D/A) converter 111.

The D/A converter 111 converts the stored image data back into the original analog signal as provided to the A/D converter 108. The slowly sampled data during the A/D conversion are stored in the memory part, but the stored data are rapidly read during the D/A conversion. Thus, the analog signal output of the D/A converter is time-compressed. This compressed image signal is provided to the signal switching combination part 112, so the compressed image signal is allocated in a portion of the main picture on the CRT.

In order to carry out such a function of PIP, the main image signal is displayed on the main picture area of the CRT in step with the synchronization signal, while the image signal for the sub picture is displayed on a sub picture area of the CRT in step with the scanning field. That is, the image signal for the main picture forms one picture (refer to FIG. 2(C)) by using the scanning method consisting of the first field (refer to FIG. 2(A)) and second field (refer to FIG. 2(B)), while the image signal for the sub picture is scanned in synchronization with the scanning method of the main picture during reading from the memory part.

But, the image signal field of the sub picture occasionally becomes reverse to that of the main picture as shown in FIG. 3. In such case, a plurality of field memories (usually 4 memories) are used to prevent the field reversal between the main picture and sub picture. In other words, the first and second image signal field of the sub picture are stored into 2 respective memories, that is, a total of 4 memories. In reading, the unused memory is read and then the first field and the second field are displayed according to the field consistent with the main picture.

But in this PIP, the resolution is degraded when making a still picture. The reason is that horizontal compression is possible since the data can be rapidly read from the memories after slowly storing the data, while vertical compression requires the reduction of a number of lines on characteristics of the sub picture being inserted into a portion of the horizontal line for the main picture.

Such phenomena can be easily understood from the conventional TV signal composition and the PIP signal composition diagram shown in FIG. 4(A) and (B). The first field of the main picture provides first line data of a first field for the sub picture, and omits second and third line data, and provides fourth line data, thereby forming the sequence of 1, 4, 7, 10 . . . (refer to FIG. 4(B)). Next, the second field of the main picture provides inter-line data of the first line data, that is, it forms the sequence of 13, 16, 19 . . . (refer to FIG. 4 (B)). Thus, the PIP is formed by the first and second field as mentioned above. At this time, a still picture is made up by reading repeatedly the stored sub picture data in the memory. When the still picture is selected, the sub picture of the PIP consists of the first field and the second field of the still picture as shown in FIG. 4(B) so that the image change between the first and second field pictures is repeated, thereby producing picture shake.

That is, there is picture shake due to the time interval between the first field and the second field. To prevent such a shake phenomenon, the conventional PIP is made up by composing the sub picture as shown in FIG. 4(C).

The still picture is made up by providing continuously the data corresponding to one field of the stored sub picture image signal in the memory according to both the first field and the second field without distinguishing the fields from each other. But, in this case the amount of data provided for the real picture reduces to a half since the data corresponding to only one field of the first field and the second field are read, so that the vertical resolution is reduced by a half.

SUMMARY OF THE INVENTION

The present invention has been made in consideration of this and has for its object to provide a method for composing a still image of a PIP to display a fine picture on a CRT when selecting a still picture for a sub picture image signal.

Another object is to provide a method and circuit for composing a still image of a PIP which has a simple composition and can be easily and widely used in the conventional TV with the function of PIP. These objects can be achieved by providing a field detector and a write address generator for a sub picture, along with a field detector and a read address generator for a main picture.

According to the present invention, there is provided a method and circuit for composing a still image of a picture-in-picture, comprising a write means for storing sub picture data of the picture-in-picture every two lines in memory, and a read means for assigning addresses so that data in odd addresses are read in a first field of a horizontal synchronization signal of the main picture and data in even addresses are read in a second field of the horizontal synchronization signal of the main picture at a starting point of the sub picture, wherein the sub picture is displayed by two fields from the data of one field of the original sub picture image.

BRIEF DESCRIPTION OF THE DRAWINGS

FIGS. 2(a) through 2(c) are image signal composition diagrams according to scanning method.

FIGS. 3(a) through 3(c) are image signal composition diagrams when the field of the main picture and the field of the sub picture are different from each other.

DETAILED DESCRIPTION OF THE INVENTION

Figure 5:
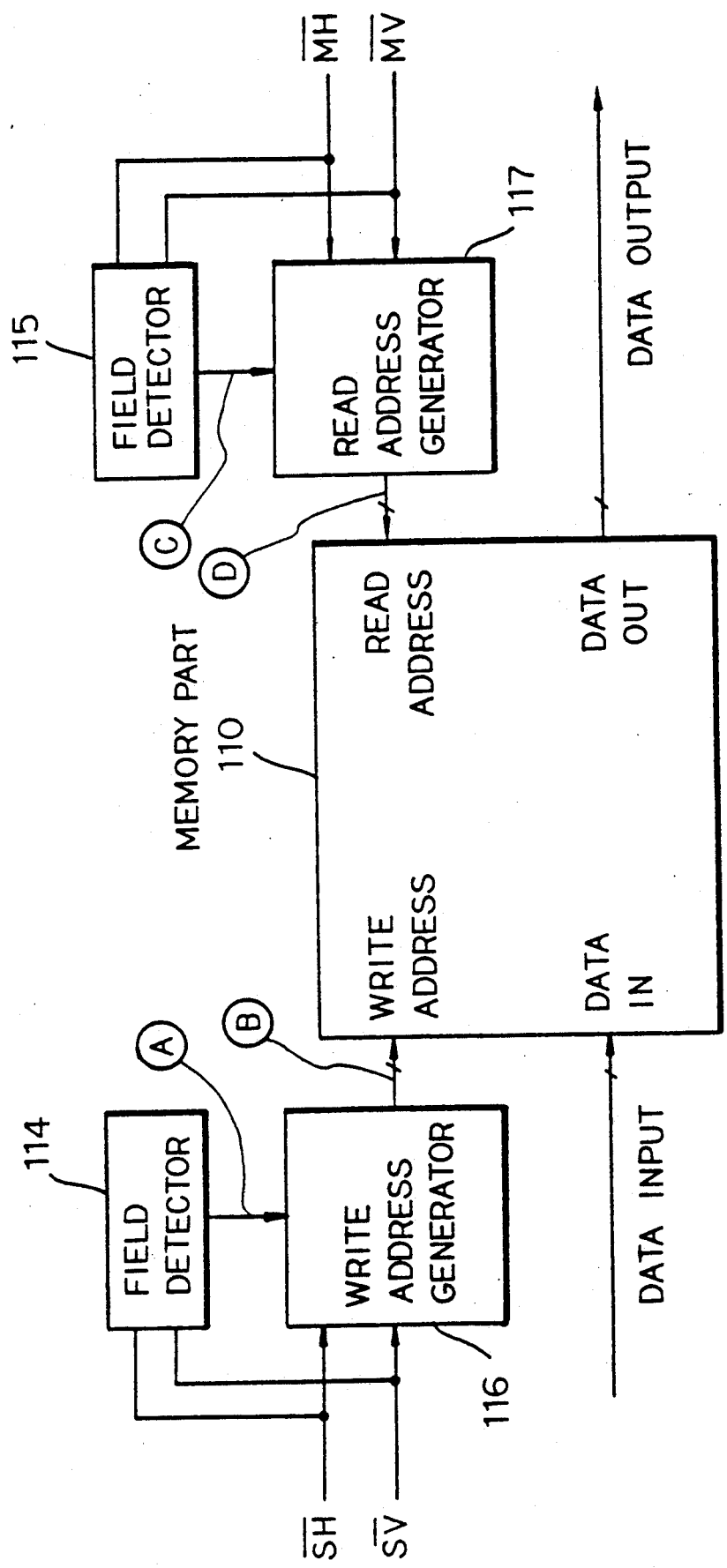
FIG. 5 is an embodiment of the present invention.

The present invention will be now described in more detail with reference to the accompanying drawings. FIG. 5 is an embodiment of the composition for the present invention. When A/D converted sub picture data are stored in memory part 110, first field detector 114 is connected to detect a field of the image signal from provided horizontal and vertical synchronization signals SH and SV for the sub picture.

A write address generator 116 which assigns the address to store data every two lines in the memory part 110 in order to vertically compress the horizontal and vertical synchronization signals SH and SV, is connected to a write address terminal of the memory part 110.

Next, when the stored data in the memory part 110 are read, second field detector 115 is connected to detect a field of the image signal by providing horizontal and vertical synchronization signals MH and MV for the main picture. A read address generator 117, which assigns the read address so that the data stored in odd addresses are read in the first field starting from the horizontal synchronization signal MH for the main picture which assigns the start point of the sub picture while the data stored in even addresses are read in the second field, is connected to the read address terminal of the memory part 110.

Figure 6:
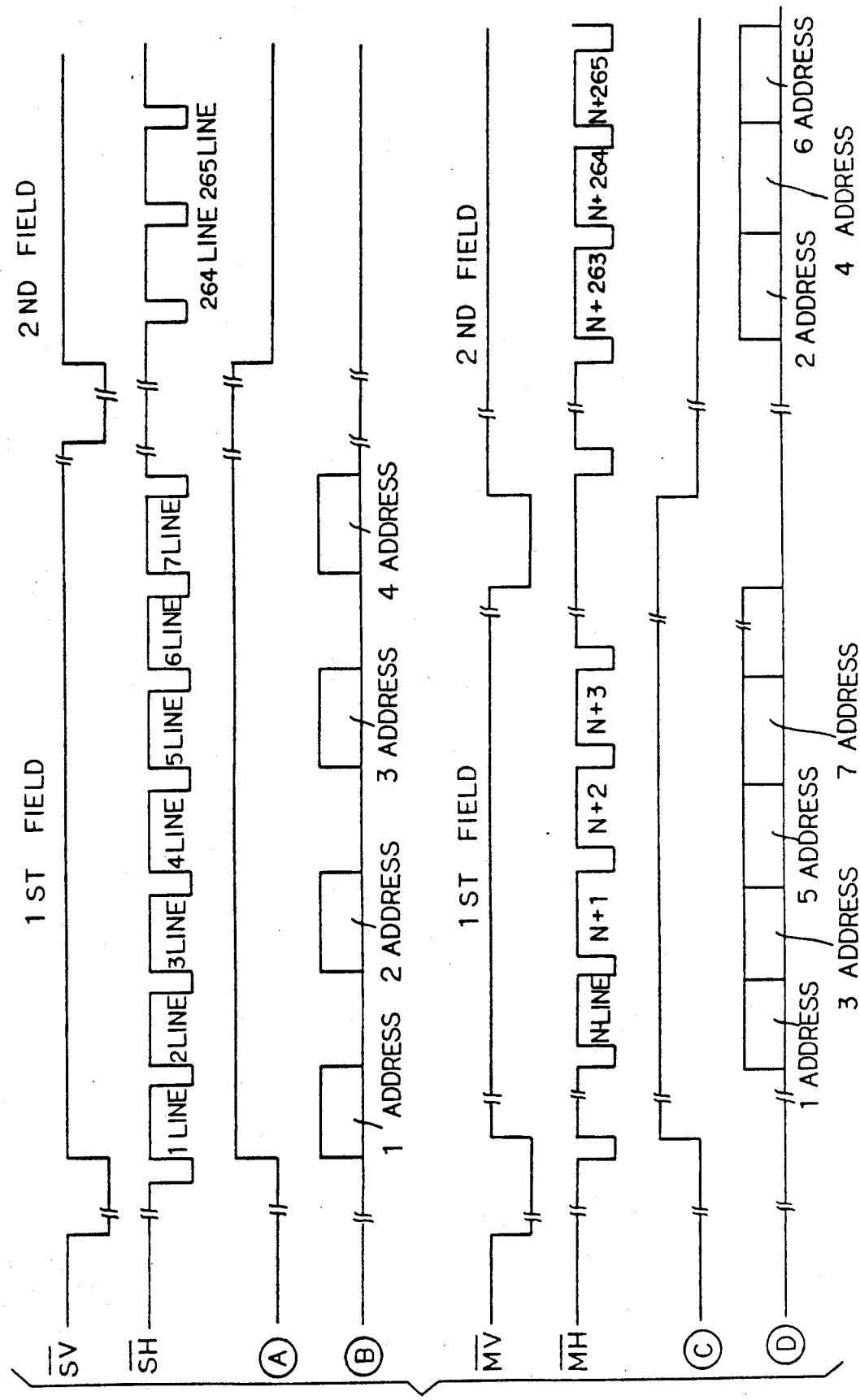
FIG. 6 is a timing diagram of the embodiment according to the present invention.

In such a composition, when the A/D converted sub picture data are stored in the memory part 110, the horizontal and vertical synchronization signals SH and SV for the sub picture as shown in FIG. 6 are applied to the first field detector 114, so the field is detected as shown in FIG. 6(A).

Next, the detected field signal of the first field detector 114 is applied to the write address generator 111 to which the horizontal and vertical synchronization signals SH and SV for the sub picture are applied. The write address generator 116 assigns the address to the memory part 110 so that the data are stored every two lines for the vertical compression as shown in FIG. 6(B).

Thus, the memory stores the D/A converted sub picture signal every two lines according to the address assigned by the write address generator 116. Similarly, when the stored data are read, the horizontal and vertical synchronization signals MH and MV for the main picture are applied to the second field detector 115, so the field is detected as shown in FIG. 6(C). The field signal detected by the second field detector 115 is applied to the read address generator 117 to which the horizontal and vertical synchronization signals MH and MV for the main picture are applied. Accordingly, the read address generator 117 provides the assigned address signal to the memory 110.

That is, when the storaged data in the memory are read, the data in the odd addresses of the memory are read one by one in the first field starting from the Nth line of the horizontal synchronization signal MH, which assigns the start point of the sub picture, while the even addresses are read in the second field as shown in FIG. 6(D). Thus, the sub picture is composed by such a method. Here, the first line reading the even addresses is the (N+263)th one (where N is a start line of the sub picture) since one field consists of 262.5 lines.

Figure 1:
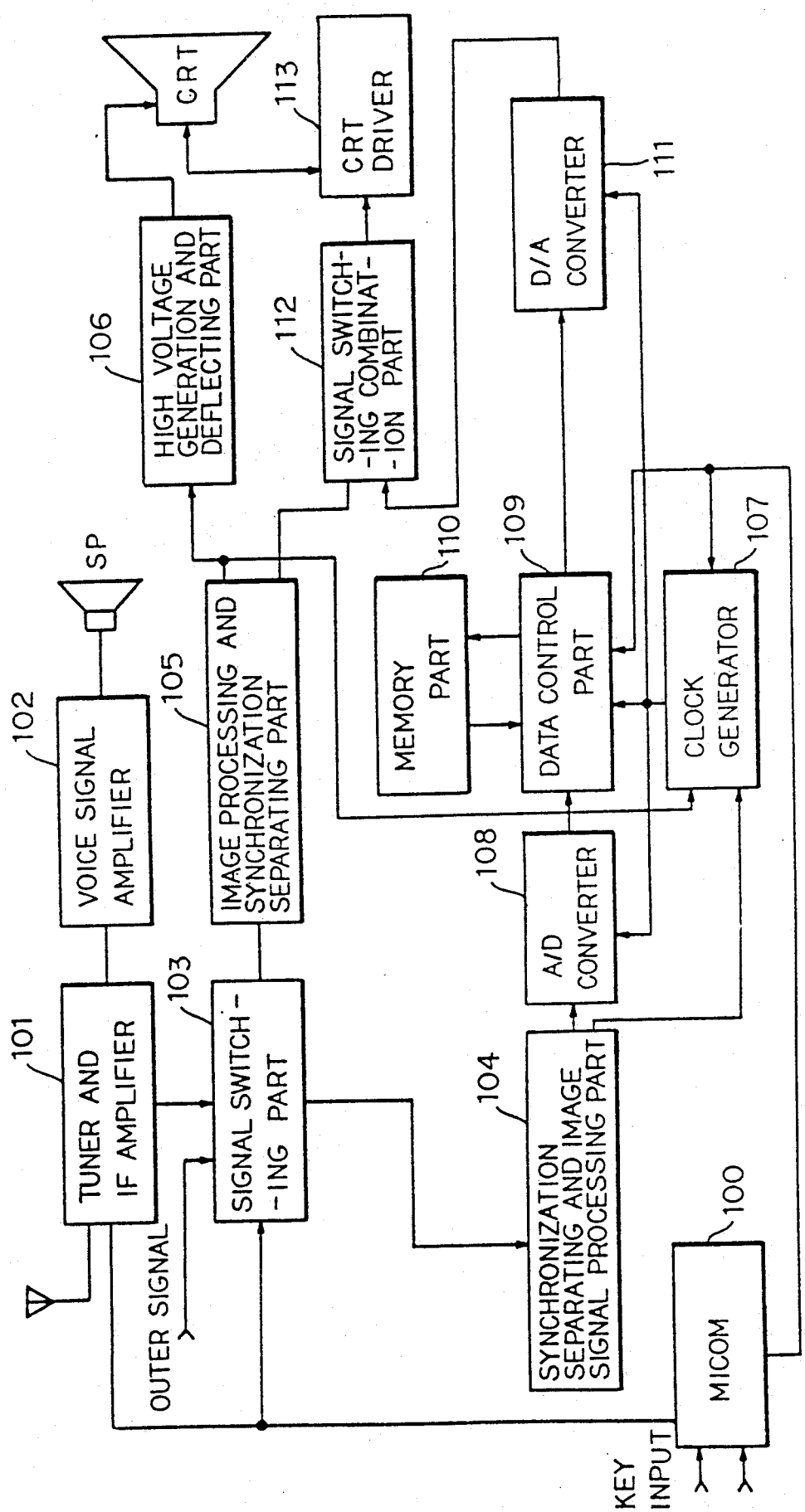
FIG. 1 is a block diagram of the conventional TV with the function of PIP.
Figure 4A:
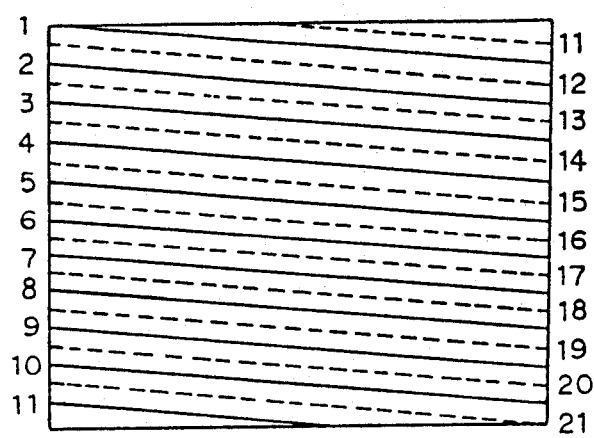
FIG. 4(a) is a conventional TV signal composition diagram.
Figure 4B:
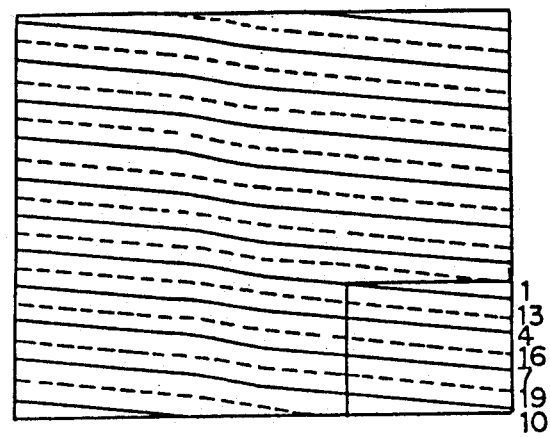
FIG. 4(b) is a conventional PIP signal composition diagram.
Figure 4C:
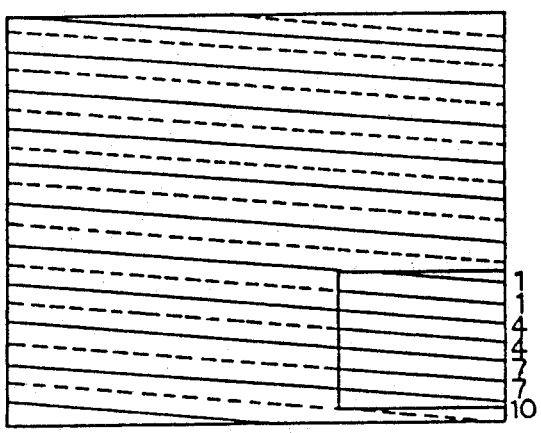
FIG. 4(c) is a still picture composition diagram of the conventional PIP.
Figure 4D:
FIG. 4(d) is a picture signal composition diagram according to the invention.

At this, when the only one field of an image signal is stored in the memory and is again read, the data are read every two lines in the first field and the omitted lines in the first field are read one by one thereby composing the sub picture. This fact is easily found in the signal composition diagram shown in FIG. 4(D).

That is, in the first field of the main picture, the first line data of the first field for the sub picture is provided and three lines are omitted, next the fifth line is again provided so that the sequence of 1, 5, 9 . . . ( refer to FIG. 4(D) ) is made up.

The second field of the sub picture is started from the 3rd line corresponding to the center line between the 1st line and 5th line of the first field of the sub picture, and three lines are similarly omitted, next the 7th line is again provided so that the sequence of 3, 7, 11, is formed.

Thus, when the still picture is made up, the vertical compression is carried out every two lines so the reduction of the vertical resolution and picture vibration are completely removed. Also, in conventional PIP composition, four memories are needed to store both the first field and second field, but in the present invention only one field is stored, thereby requiring the smaller capability of the memory.

But while the real image signal consists of 60 pictures per second using 60 fields, this invention employs 30 pictures with 60 fields per second so that while the continuity of the movement is not smooth, it is nearly indistinguishable by eyesight, compared to 24 pictures with 48 fields used in the cinema theater.

As mentioned above, the present invention selects one field of the sub picture and stores it after vertically compressing every two lines, and read it again in odd addresses of the memory in the first field, while even addresses of the memory are read in the second field in order to display it on the CRT, thereby removing the picture shake and the reduction of the vertical resolution during the still picture composition. In addition, the used memory capability becomes smaller, thereby obtaining economic merits.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A circuit for composing a video sub picture for a picture-in-picture (PIP) video display displaying a main picture and a sub picture within said main picture, the circuit comprising:
    addressable memory means for writing and reading-out video image data, said memory means having a video image data input for receiving video image data, a write address input, a read address input and a video image data output;
    writing means operably connected to the write address input of said memory means for writing video data of every second scan line of a video image field data applied to the video image data input of said memory means for storing said video data in said memory means; and
    reading means operably connected with the read address input of said memory means for generating read addresses of said memory means for reading-out stored video data from odd-numbered addresses of said memory means in accordance with a main picture horizontal synchronization signal of a first video field of a main video picture corresponding to a starting point of a first field of a PIP display within said main video picture, for composing a first field of a video sub picture from said read-out video data of said odd-numbered memory addresses, and for reading-out stored video data from even-numbered addresses of said memory means in accordance with a main video picture horizontal synchronization signal of a second video field of said main video picture corresponding to a starting point of a second field of said PIP, for composing a second video field of said video sub picture from said read-out data of said even-numbered memory addresses, whereby the first and second video fields of a video sub picture are composed from video data of a single input video image field.

2. A circuit according to claim 1, wherein said writing means comprises:
    first field detector means receiving horizontal and vertical synchronization signals of an input video image field, for detecting an input video image field data to be displayed as a video sub picture; and
    write address generator means operably connected with said first field detector means and receiving said horizontal and vertical synchronization signals of said input video image field data therefrom and also being operably connected with said write address input of said memory means and responsive to detection of said input video image field by said first field detector means, for assigning memory addresses for storing the video data of every second line of said input video image field data in said memory means, for thereby vertically compressing said input video image field data.

3. A circuit according to claim 1, wherein said reading means comprises:
    second field detector receiving horizontal and vertical synchronization signals of a main picture video signal, for detecting first and second field signals of a main video picture;
    read address generator means operably connected with said second field detector means and receiving said horizontal and vertical synchronization signals of said main picture video signal therefrom and also being operably connected with said read address input of said memory means and responsive to detection of said first and second fields of said main picture video signal by said second field detector means, for generating memory addresses for reading-out video data stored at odd-numbered memory addresses of said memory means in response to detection of said first field signal of said main picture by said second field detector means and in step with horizontal and vertical synchronization signals of said first field signal of said main picture video signal, and for generating memory addresses for reading-out video data stored at even-numbered memory addresses of said memory means in response to detection of said second field signal of said main picture by said second field detector means and in step with horizontal and vertical synchronization signals of said second field signal of said main picture video signal.

4. A method for composing a video sub picture for a picture-in-picture (PIP) video display displaying a main picture and a sub picture within said main picture, comprising:
    storing, in an addressable memory, video data of every second line of an input video image field to be displayed as a sub picture;
    reading-out the video data stored at odd-numbered addresses of said memory in step with a first field signal of a video main picture for composing a first field of a video sub picture; and
    reading-out the video data stored at even-numbered addresses of said memory in step with a second field signal of a video main picture for composing a second video sub picture field;
    thereby composing the first and second video fields of a video sub picture from video data of a single input video image field.

* * * * *

UNITED STATES PATENT AND TRADEMARK OFFICE
CERTIFICATE OF CORRECTION

PATENT NO. : 5,021,887
DATED : June 4, 1991
INVENTOR(S) : Yung-Jun Park

It is certified that error appears in the above-indentified patent and that said Letters Patent is hereby corrected as shown below:

Column 1,    Line 9,    After "composing", Insert --a-- ;

Column 2,    Line 54,   Preceding "half", Delete "a" ;

Line 56,   Preceding "half", Delete "a" .

Column 1,    Line 8,    Delete "composing" after "a".

Signed and Sealed this

Twenty-eighth Day of November 1995

Attest:

BRUCE LEHMAN

*Attesting Officer*     *Commissioner of Patents and Trademarks*